July 13, 1965 G. R. SNURR 3,194,348
RAIL BRAKE FOR DRAFTING MACHINES AND THE LIKE
Original Filed July 23, 1959
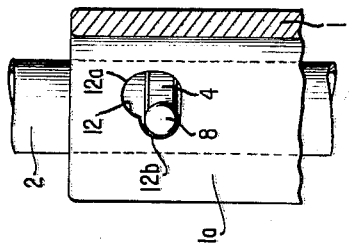
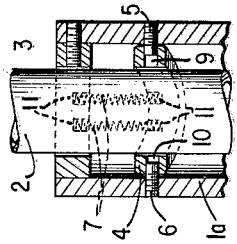
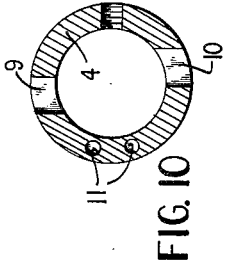
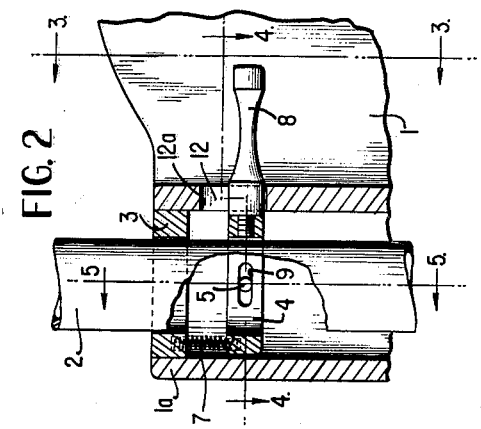
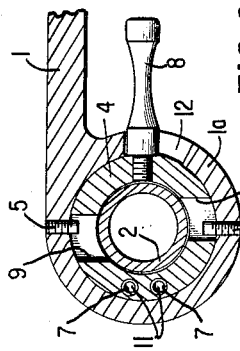
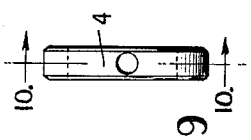
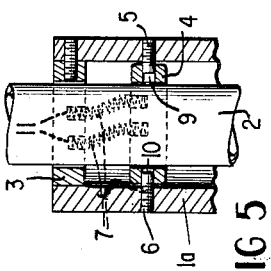
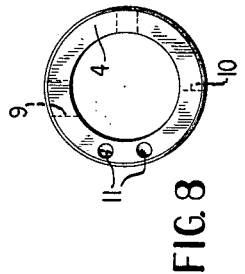
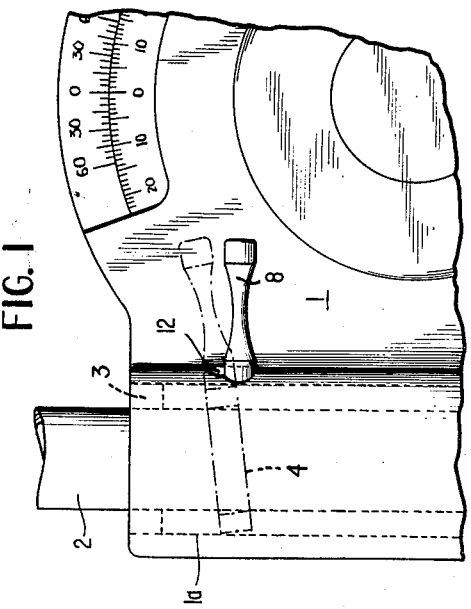
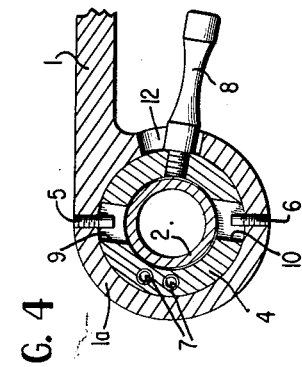
INVENTOR.
GORDON R. SNURR
BY
*Rupert J. Brady*
ATTORNEY

United States Patent Office 3,194,348
Patented July 13, 1965

3,194,348
RAIL BRAKE FOR DRAFTING MACHINES
AND THE LIKE
Gordon R. Snurr, Franklin, Pa., assignor to Glideline
Corporation, Waynesboro, Pa., a corporation of
Pennsylvania
Original application July 23, 1959, Ser. No. 828,984, now
Patent No. 3,131,478, dated May 5, 1964. Divided
and this application May 8, 1963, Ser. No. 278,909
6 Claims. (Cl. 188—67)

My invention relates broadly to rail brakes and more particularly to a rail brake for drafting machines and the like for selectively locking a drafting machine part, such as a protractor assembly, in selected position on a drafting machine rail.

This application is a division of my copending application Serial No. 828,984, filed July 23, 1959, now Patent No. 3,131,478, granted May 5, 1964, for "Protractor for Drafting Machine."

One of the objects of the invention is to provide a simple construction of rail brake which provides positive non-slip locking engagement with a cylindrical rail and which can easily be moved into and out of locking engagement with the rail.

Another object of the invention is to provide a novel construction of rail brake which is rugged in construction and provides positive means for maintaining the same in locked and unlocked position.

Another object of the invention is to provide a construction of rail brake in which the locking member is movable in two planes.

A further object of the invention is to provide a construction of rail brake for a drafting machine protractor in which the protractor assembly is selectively locked to the drafting machine vertical rail by a simple spring biased pivoted lock ring disposed about the rail and cocked at acute angles with respect to the rail into engagement with the vertical rail.

Other and further objects of the invention reside in the novel construction of rail locking mechanism as set forth more fully in the specification hereinafter following by reference to the accompanying drawings, in which:

FIG. 1 is a side elevational view of the rail brake assembly of the invention, with parts shown in phantom and showing a fragmentary portion of a drafting machine protractor connected thereto;

FIG. 2 is a transverse sectional view through the rail locking mechanism showing the mechanism in the unlocked position;

FIG. 3 is a view taken substantially along line 3—3 of FIG. 2;

FIG. 4 is a cross-sectional view taken substantially along line 4—4 of FIG. 2;

FIG. 5 is a transverse sectional view taken substantially along line 5—5 of FIG. 2, with the rail shown in elevation;

FIG. 6 is a cross-sectional view, similar to FIG. 4, but showing the rail brake or rail lock mechanism in the locked position;

FIG. 7 is a transverse sectional view similar to FIG. 5 but showing the rail brake in locked position;

FIG. 8 is a top plan view of the lock ring member of the rail locking mechanism;

FIG. 9 is a side elevational view of the lock ring member of FIG. 8; and

FIG. 10 is a cross-sectional view taken on line 10—10 of FIG. 9.

This invention is directed to a construction of rail brake wherein a rail passes through a housing having a bearing lined bore such that the only connections between the housing and the rail are rolling ball bearing contacts. At one end of the bored housing, or protrusion from a housing, a rail brake or rail locking mechanism is provided to securely lock the housing at any desired point along the rail. This is accomplished by cocking a spring-loaded lock ring, which encircles the rail, at an acute angle to the rail so as to grip the rail and prevent any movement between the housing carrying the lock ring, through a pivotal connection, and the rail.

Referring to the drawing in greater detail, the housing of a protractor assembly or the like is designated at 1 carrying the bored protrusion 1a for engagement with the vertical rail 2 of a drafting machine. The protractor assembly is arranged to travel up and down the vertical rail 2 of the drafting machine, but it is to be understood that the protrusion 1a can have any type member connected to it which is to be locked to rail 2 and that the rail brake of the invention set forth herein is described in association with a drafting machine rail and protractor assembly merely for purposes of illustration. To provide smooth glading movement for the protractor assembly as it travels along the vertical rail the interior bored portion of the protrusion 1a carries ball bushing units (not shown) secured therein and disposed between the rail 2 and the housing protrusion 1a. These ball bearing units carry ball bearings which provide rolling contact between the protrusion encircling the rail and the rail, the ball bearings being arranged to insure a smooth "slide fit" without shake or play as the unit travels along the rail. These ball bushing units preferably contain precision nylon ball bearings, thus eliminating the necessity of lubrication, insuring longer life and providing a quieter operating drafting machine. In applications other than drafting machines the protrusion 1a may be slidably connected to the rail by other suitable bushings, bearing means, or the like.

The top end of bore protrusion 1a is substantially closed around the circumference of the vertical rail by spring plate 3 secured to the interior of the bore. The clearance provided between spring plate 3 and rail 2 is very slight so that the spring plate can also act as a rail wiper for removing large particles of eraser dust, etc., from the rail and thus prevent its entrance into the ball bushing units and the rail brake or rail locking mechanism.

The rail brake or locking mechanism of the invention is located adjacent the spring plate, interiorly of the bored protrusion 1a, and consists of brake or lock ring 4, lock ring guides 5 and 6, vertical lock springs 7 and lock or brake acutating lever 8. Lock ring 4 provides slots 9 and 10, off-center with respect to each other with one end of the slots in registration, through the side walls thereof for slidable engagement with lock ring guides 5 and 6 which are secured in the walls of protrusion 1a and protrude outwardly into the interior bore thereof into slots 9 and 10, respectively, of the lock ring. The top surface of the lock ring provides recessed mounting holes 11 for springs 7, with the bottom surface of spring plate 3 providing similar mounting holes oppositely situated from those on the lock ring 4, and springs 7 are mounted in a compressed state between the spring plate and the lock ring in the respective mounting holes provided thereon.

Lock lever 8 is threaded into the side of the lock ring opposite the mounting holes 11 and protrudes through the irregular shaped opening 12 in the side wall of protrusion 1a as more clearly shown in FIG. 3. Irregular shaped opening 12 provides a high abutting edge 12a for lever 8 for the locked position of the locking mechanism as shown in FIGS. 1 (dotted), 6 and 7, and a low abutting edge 12b for lever 8 when the same is depressed and rotated to the unlocked position of the rail locking mechanism as shown in FIGS. 1–5. In the locked position lever 8 abuts the edge 12a of opening 12, guides 5 and 6 are moved to a position in the ends of slots 9 and 10 by counter-clockwise rotation of the lock or brake ring, as shown in FIG. 6, and springs 7 exert a downward force on lock ring 4 and pivot it about guides 5 and 6 to a cocked position against rail 2 as shown in FIGS. 6 and 7. The springs 7 thus hold the brake or lock ring rigidly against the vertical rail in such a manner that the housing which carries the lock ring is rigidly locked from movement with respect to the rail 2. The interior edges of the lock ring are left sharp to enable them to grip rail 2 and thus hold the assembly connected thereto in an immovable position with respect to the rail, while the exterior edges of lock ring 4 are rounded to enable it to be cocked sideways in the bore of protrusion 1a without catching on the interior side walls thereof.

To unlock the housing carrying the rail brake from its locked position on the rail, the lever 8 is pushed downward and rotated slightly clockwise to a position as shown in FIGS. 2–5. In this position the lock ring 4 has been pivoted about guides 5 and 6 into a substantially horizontal position, thus further compressing springs 7. As the lock ring is rotated clockwise by lever 8, lever 8 comes into contact with the edge 12b of opening 12 and is held in abutment with this edge by the downwardly directed force of springs 7. The clockwise movement of lock ring 4 positions the guides 5 and 6 to approximately the center position of slots 9 and 10 as shown in FIG. 4, and moves the mounting holes for springs 7 in spring plate 3 and lock ring 4 off-center with respect to each other thus putting a curve in the springs as shown in FIG. 5. In the unlocked position the interior edges of lock ring 4 are moved out of contact with the vertical rail and the protrusion 1a and assembly connected thereto are free to travel up and down or along the rail.

The rail brake mechanism of the invention has been constructed and used on drafting machines and has been found to be very rugged, useful, efficient, reliable, easy to manipulate and unyieldable in the locked state under normal operating conditions.

While the rail brake or lock ring assembly of the invention has been described in certain preferred embodiments it is realized that modifications can be made and it is to be understood that no limitations upon the invention are intended other than which may be imposed by the scope of the appended claims.

What I claim as new and desire to secure by Letters Patent of the United States, is as follows:

1. A rail brake for a rail comprising, a housing having interior walls disposed adjacent the rail, a pair of pivotal guide means extending from the interior walls of said housing, a lock ring encircling the rail, said lock ring engaged by said pair of pivotal guide means whereby said lock ring is adapted to pivot longitudinally of the rail and rotate laterally, means connected with said lock ring for pivoting and resiliently maintaining said lock ring in engagement with the rail to securely lock the housing to the rail, means connected between said lock ring and said housing for pivoting said lock ring out of engagement with the rail and laterally rotating said lock ring on said pair of pivoted guide means to connect said ring to said housing for maintaining the lock ring in a disengaged position.

2. A rail brake as set forth in claim 1 in which said lock ring contains elongated slots in opposite side walls thereof for pivotal engagement and rotative sliding engagement with said pair of pivotal guide means.

3. A rail brake as set forth in claim 1 in which said means for maintaining said lock ring in engagement with said rail consists of bias springs extending between said housing and said lock ring, said bias springs extending in a plane substantially parallel with the rail and having ends adapted to be offset relative to each other upon rotation of the lock ring.

4. A rail brake as set forth in claim 1 in which said lock ring is rotatable in a plane substantially perpendicular with the rail to maintain said lock ring in the disengaged position.

5. A rail brake as set forth in claim 1 in which said means connected for pivoting said lock ring out of engagement with the rail consists of a lever arm extending from said lock ring, said housing having an irregular shaped opening, said lever arm extending through the irregular-shaped opening, and said irregular-shaped opening having abutting limit stop edges in longitudinal spaced relation and laterally offset relative to each other for engaging said lever arm and maintaining the same in selected positions upon rotation of said ring.

6. A brake mechanism for use in combination with a rail comprising, a housing having inner walls adjacent the rail in spaced relation and movable along the rail, a pair of pivotal guide elements extending from the inner walls of said housing, a lock member surrounding the rail and disposed intermediate the rail and said inner walls, said lock member engaging said pair of pivotal guide elements in pivotal and sliding relation, means connected with said lock member for pivoting and urging the same into locking engagement with said rail to securely lock the housing to the rail, and means for imparting pivotal and rotative movement to said lock member relative to said pivotal guide elements to move said lock member out of locking engagement with the rail to allow free travel of said housing along the rail and maintain it in a disengaged position against the urging of said means connected with said lock member.

References Cited by the Examiner

UNITED STATES PATENTS

| 216,546 | 6/79 | Weston et al. | 188—20 |
| 957,333 | 5/10 | Hawkins et al. | 188—67 |
| 991,241 | 5/11 | Rae | 188—67 |
| 1,313,520 | 8/19 | Cole | 33—79 |
| 1,352,172 | 9/20 | Brandon | 188—67 |
| 2,948,356 | 8/60 | Butler | 188—67 |

FOREIGN PATENTS

| 247,727 | 2/26 | Great Britain. |
| 589,028 | 2/59 | Italy. |
| 957,409 | 10/49 | France. |

ARTHUR L. LA POINT, *Primary Examiner.*

EUGENE G. BOTZ, *Examiner.*